(12) United States Patent
Faoro et al.

(10) Patent No.: US 7,677,452 B2
(45) Date of Patent: Mar. 16, 2010

(54) METHOD AND SYSTEM FOR PROVIDING SIGNATURES FOR MACHINES

(75) Inventors: Michael David Faoro, Old Hickory, TN (US); J. Joseph Gualandri, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 880 days.

(21) Appl. No.: 11/477,514

(22) Filed: Jun. 30, 2006

(65) Prior Publication Data

US 2008/0000959 A1 Jan. 3, 2008

(51) Int. Cl.
*G06F 19/00* (2006.01)
(52) U.S. Cl. ......................................... 235/385; 701/35
(58) Field of Classification Search ................. 235/382; 701/35; 713/170; 348/148
See application file for complete search history.

(56) References Cited

U.S. PATENT DOCUMENTS

| | | | |
|---|---|---|---|
| 4,177,466 A | 12/1979 | Reagan | |
| 4,818,998 A | 4/1989 | Apsell et al. | |
| 5,055,851 A | 10/1991 | Sheffer | |
| 5,229,648 A | 7/1993 | Sues et al. | |
| 5,418,537 A | 5/1995 | Bird | |
| 5,563,579 A | 10/1996 | Carter | |
| 5,661,473 A | 8/1997 | Paschal | |
| 5,895,436 A | 4/1999 | Savoie et al. | |
| 5,929,753 A | 7/1999 | Montague | |
| 5,951,611 A | 9/1999 | La Pierre | |
| 5,991,673 A | 11/1999 | Koopman, Jr. et al. | |
| 6,025,774 A | 2/2000 | Forbes | |
| 6,034,596 A | 3/2000 | Smith et al. | |
| 6,052,065 A | 4/2000 | Glover | |
| 6,067,007 A | 5/2000 | Gioia | |
| 6,157,317 A | 12/2000 | Walker | |
| 6,184,801 B1 | 2/2001 | Janky | |
| 6,216,066 B1 | 4/2001 | Goebel et al. | |
| 6,222,463 B1 | 4/2001 | Rai | |
| 6,262,659 B1 | 7/2001 | Korkosz et al. | |
| 6,292,723 B1 | 9/2001 | Brogan et al. | |
| 6,298,306 B1 | 10/2001 | Suarez et al. | |
| 6,301,531 B1 | 10/2001 | Pierro et al. | |
| 6,314,350 B1 | 11/2001 | Butz et al. | |
| 6,336,065 B1 | 1/2002 | Gibson et al. | |
| 6,339,745 B1 | 1/2002 | Novik | |
| 6,366,199 B1 | 4/2002 | Osborn et al. | |
| 6,405,108 B1 | 6/2002 | Patel et al. | |
| 6,408,259 B1 | 6/2002 | Goebel et al. | |

(Continued)

FOREIGN PATENT DOCUMENTS

GB 2335002 A 9/1999

(Continued)

*Primary Examiner*—Daniel A Hess
(74) *Attorney, Agent, or Firm*—Finnegan, Henderson, Farabow, Garrett & Dunner

(57) ABSTRACT

A method for identifying a machine and/or machine component includes storing an algorithm for generating a machine signature value associated with the machine and/or machine component. The method also includes receiving a first set of machine data from the machine and/or machine component. The machine data reflects at least one operational characteristic of the machine and/or machine component. The method also includes generating, using the algorithm, a first machine signature value based on the first set of machine data, storing the first machine signature value, and accessing the stored first machine signature value to verify the identity of the machine and/or machine component.

18 Claims, 6 Drawing Sheets

U.S. PATENT DOCUMENTS

| | | | |
|---|---|---|---|
| 6,434,458 | B1 | 8/2002 | Laguer-Diaz et al. |
| 6,437,705 | B1 | 8/2002 | Barich et al. |
| 6,490,513 | B1 | 12/2002 | Fish et al. |
| 6,501,849 | B1 | 12/2002 | Gupta et al. |
| 6,502,018 | B1 | 12/2002 | Bessler |
| 6,539,271 | B2 | 3/2003 | Lech et al. |
| 6,543,007 | B1 | 4/2003 | Bliley et al. |
| 6,580,983 | B2 | 6/2003 | Laguer-Diaz et al. |
| 6,591,182 | B1 | 7/2003 | Cece et al. |
| 6,611,740 | B2 | 8/2003 | Lowrey et al. |
| 6,636,771 | B1 | 10/2003 | Varma et al. |
| 6,636,790 | B1 | 10/2003 | Lightner et al. |
| 6,643,801 | B1 | 11/2003 | Jammu et al. |
| 6,647,356 | B2 | 11/2003 | Pierro et al. |
| 6,650,949 | B1 | 11/2003 | Fera et al. |
| 6,651,034 | B1 | 11/2003 | Hedlund et al. |
| 6,691,064 | B2 | 2/2004 | Vroman |
| 6,708,038 | B1 | 3/2004 | Laguer-Diaz et al. |
| 6,732,031 | B1 | 5/2004 | Lightner et al. |
| 6,738,931 | B1 | 5/2004 | Osborn et al. |
| 6,781,513 | B1 | 8/2004 | Korkosz et al. |
| 6,791,456 | B2 | 9/2004 | Nakayama et al. |
| 6,799,154 | B1 | 9/2004 | Aragones et al. |
| 6,801,312 | B1 | 10/2004 | Tiwald |
| 6,833,787 | B1 | 12/2004 | Levi |
| 6,850,869 | B2 | 2/2005 | Pierro et al. |
| 6,856,968 | B2 | 2/2005 | Cooley et al. |
| 6,885,903 | B2 | 4/2005 | Olle et al. |
| 6,901,377 | B1 | 5/2005 | Rosenfeld et al. |
| 6,917,306 | B2 | 7/2005 | Lilja |
| 6,947,797 | B2 | 9/2005 | Dean et al. |
| 6,950,829 | B2 | 9/2005 | Schlabach et al. |
| 6,957,133 | B1 | 10/2005 | Hunt et al. |
| 6,959,235 | B1 | 10/2005 | Abdel-Malek et al. |
| 6,980,124 | B2 | 12/2005 | Kong et al. |
| 6,985,803 | B2 | 1/2006 | Abdel-Malek et al. |
| 6,988,011 | B2 | 1/2006 | Varma et al. |
| 6,993,675 | B2 | 1/2006 | Roddy et al. |
| 6,996,498 | B2 | 2/2006 | Pierro et al. |
| 7,031,239 | B2 | 4/2006 | Takahashi et al. |
| 7,031,878 | B2 | 4/2006 | Cuddihy et al. |
| 7,436,431 | B2 * | 10/2008 | Adachi et al. ............... 348/148 |
| 2002/0173885 | A1 | 11/2002 | Lowrey et al. |
| 2004/0003249 | A1 | 1/2004 | Dabbish et al. |
| 2004/0004540 | A1 | 1/2004 | Komatsu et al. |
| 2004/0235516 | A1 | 11/2004 | Otsuki et al. |
| 2004/0236489 | A1 | 11/2004 | Shibamori et al. |
| 2005/0171660 | A1 | 8/2005 | Woolford et al. |
| 2006/0041380 | A1 | 2/2006 | Motoyama et al. |
| 2006/0055564 | A1 | 3/2006 | Olsen et al. |
| 2006/0071783 | A1 | 4/2006 | Culpepper et al. |
| 2006/0095175 | A1 | 5/2006 | deWaal et al. |

FOREIGN PATENT DOCUMENTS

| | | |
|---|---|---|
| GB | 2374227 A | 10/2002 |
| GB | 2420052 | 5/2006 |
| JP | 2000-259900 | 9/2000 |
| JP | 2001-343446 | 12/2001 |
| WO | WO 98/56626 | 12/1998 |

* cited by examiner

METHOD AND SYSTEM FOR PROVIDING SIGNATURES FOR MACHINES

TECHNICAL FIELD

The present disclosure relates generally to a method and system for identifying machines, and more particularly, to a method and system for providing machine signatures.

BACKGROUND

Machines and machine components have routinely been the target of thieves, especially when there is a need for equipment, such as after a natural disaster. Stolen machines may be stripped and sold for parts, and therefore, create difficulties for authorities and machine owners to identify missing parts. To assist with identifying machines and machine components, markings are used, such as labels, etchings, etc., that uniquely identify a given component or machine. However, these markings may be removed or altered to change the identification information.

Furthermore, law enforcement officials may not be trained to identify machines properly. For example, transported machines that are subject to inspection may have identification information printed on a component or sticker attached to the machine. However, alterations to the identification information frustrate the machine identification process. That is, law enforcement attempts to accurately identify machines with altered markings and identifications hinder the ability to locate missing machines and components.

One method of locating missing equipment is described in U.S. Pat. No. 5,661,473 (the '473 patent) issued to Paschal. The '473 patent describes a system for automatically identifying and detecting vehicles. The system uses an electronic label having transmission and reception devices to transmit and store an identification code of the vehicle. A mobile reader may be used to store identification codes of stolen vehicles and may prompt a transmission of the identification code from the electronic label to compare the transmitted identification code to the stored identification codes of the stolen vehicles.

Although the system of the '473 patent may provide a mechanism to identify vehicles using identification information stored on an electronic label, the system relies solely on identification codes, such as a vehicle registration number. However, registration numbers, even if stored on an electronic label, may be altered and replaced by false registration numbers, thereby preventing recovery of stolen or missing machines.

The disclosed embodiments are directed to overcoming one or more of the problems set forth above.

SUMMARY OF THE INVENTION

In one aspect, the present disclosure is directed to a method for identifying a machine and/or machine component including storing an algorithm for generating a machine signature value associated with the machine and/or machine component. The method also includes receiving a first set of machine data from the machine and/or machine component. The machine data reflects at least one operational characteristic of the machine and/or machine component. The method also includes generating, using the algorithm, a first machine signature value based on the first set of machine data, storing the first machine signature value, and accessing the stored first machine signature value to verify the identity of the machine and/or machine component.

In another aspect, the present disclosure is directed to a method for identifying a machine and/or machine component including generating a first machine signature value associated with the machine and/or machine component at a first location and associating the first machine signature value with identification information for the machine and/or machine component. The method also includes generating a second machine signature value associated with the machine and/or machine component at a second location, comparing the first machine signature value to the second machine signature value, and identifying the machine and/or machine component based on the comparison of the first and second machine signature values.

In yet another aspect, the present disclosure is directed to a system for identifying a machine and/or machine component. The system includes a service center configured to store an algorithm for generating a machine signature value associated with the machine and/or machine component, and receive a first set of machine data from the machine and/or machine component. The machine data reflects at least one operational characteristic of the machine and/or machine component. The service center is also configured to generate a first machine signature value based on the algorithm and the first set of machine data, store the first machine signature value, and access the stored first machine signature value to verify the identity of the machine and/or machine component.

DETAILED DESCRIPTION

Figure 1:
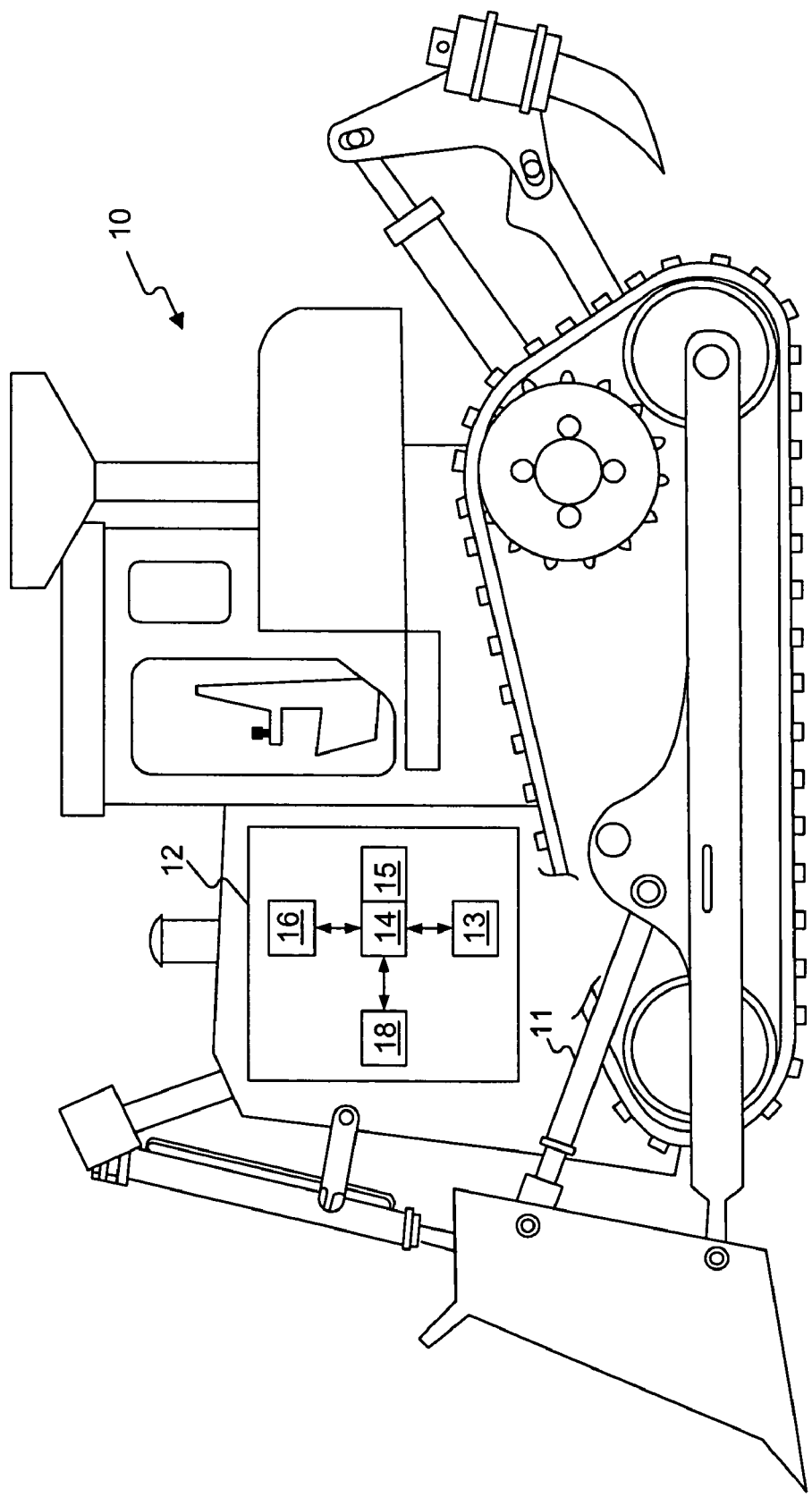
FIG. 1 is a diagrammatic illustration of an exemplary machine consistent with certain disclosed embodiments.

FIG. 1 illustrates an exemplary machine 10 having one or more components 11. A machine component 11 may be an electronic, electrical, mechanical, electro-mechanical, etc., portion of machine 10 that performs some operation related to the overall operation of machine 10 (e.g., a hydraulic component, an engine, a transmission, etc.). Machine 10 may embody a fixed or mobile machine that performs some type of operation associated with an industry such as mining, construction, farming, transportation, or any other industry known in the art. For example, machine 10 may be a commercial machine, such as a truck, crane, earth moving machine, mining vehicle, material handling equipment, farming equipment, marine vessel, aircraft, an excavator, a dozer, a loader, a backhoe, a motor grader, a dump truck, or any type of machine that operates in a work environment such as a construction site, mine site, power plant, etc.

Machine 10 may be equipped with a data communication system 12, which includes at least one electronic control module (ECM) 13, a gateway processor device 14, a transceiver device 15, and a global positioning satellite (GPS) device 16. Although the following description relates to the identification of machine 10, one or more machine components 11 may each also be equipped with data communication system 12. Accordingly, in certain embodiments, machine 10 may include multiple data communication systems 12 mounted on one or more separate machine components 11.

Data communication system 12 may be a system configured to collect and transmit machine data, location data, and identification data. In one embodiment, ECM 13 stores machine data including, for example, identification information specific to machine 10. For example, the identification information may include a machine identifier (e.g., a serial number, registration number, or other information assigned to machine 10). Further, ECM 13 may collect and/or store other types of machine data, such as scheduling data (e.g., when machine 10 is scheduled to change location and/or how long machine 10 is scheduled to remain at a location, identification of types of authorized operations during scheduled shifts, etc.), machine operational data (e.g., operational historical parameter data (e.g., oil pressure, motor speed, temperatures, fluid levels, and/or other parameter data related to the operation of machine 10 or a component 11)), timings, fault codes, etc. ECM 13 may collect the machine data from one or more machine components 11. Alternatively, or in addition, ECM 13 may collect machine data from one or more other ECMs 13 associated with one or more other machine components 11.

ECM 13 may also be associated with at least one sensor (not shown) for monitoring and recording at least one type of machine data. For example, an engine ECM may receive signals from engine sensors, such as, for example, an atmospheric pressure sensor, a fuel flow sensor, a boost pressure sensor, a water temperature sensor, and an engine speed sensor. Additional sensors may be included to measure other properties of the engine as necessary, as would be apparent to one skilled in the art. Another exemplary ECM is a transmission ECM, which may be associated with sensors that monitor the transmission, such as a gear code sensor, a transmission output speed sensor, and a differential oil temperature sensor. Other sensors may be associated with the transmission ECM as would be apparent to one skilled in the art.

As explained, machine 10 may include multiple ECMs 13. Each of these ECMs 13 may be different types of ECMs 13. For example, machine 10 may include a hydraulic system ECM, a chassis ECM, and/or a brake/cooling ECM. These other ECMs may also be associated with one or more sensors for collecting machine data related to one or more machine components 11, such as a hydraulic system, the chassis, the brake/cooling systems, etc. Other sensors and ECMs may be included for collecting machine data related to other components as would be apparent to one skilled in the art. Each ECM may be associated with one or more sensors, and the specific types of sensors and the number of sensors associated with each ECM may be based on the type of application and information to be obtained by the sensors.

Figure 2:
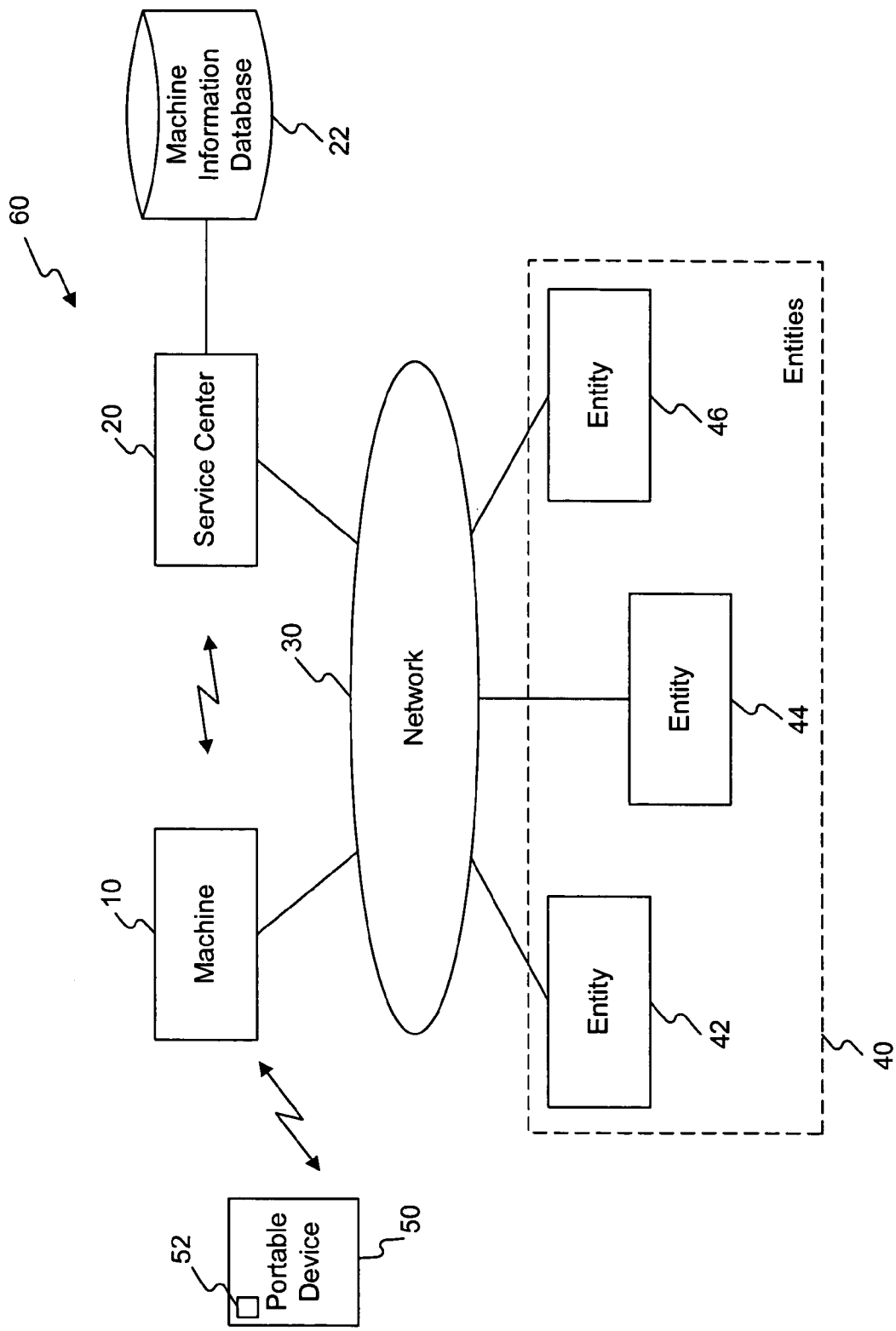
FIG. 2 is a schematic diagram illustrating an exemplary communication system consistent with certain disclosed embodiments.

Gateway processor device 14 includes one or more processor devices that execute program instructions to perform various functions such as requesting and/or receiving information from ECM 13 and GPS device 16. Further, gateway processor device 14 may generate messages to transmit to an off-board system, such as a service center 20 (FIG. 2). Gateway processor device 14 may be configured with different types of hardware and/or software (e.g., a microprocessor, a gateway, a product link device, a communication adapter, etc.). Gateway processor device 14 may also provide interface functions for transmitting data to, and receiving data from, data communication system 12. Further, gateway processor device 14 may execute software for performing one or more functions consistent with the disclosed embodiment. Also, gateway processor device 14 may include storage device(s) for maintaining data for use by one or more on-board modules (e.g., ECM 13), or one or more off-board systems (e.g., service center 20). For example, gateway processor device 14 may be configured to perform protocol conversions (e.g., tunneling and translations), intelligent routing, and server-based operations, such as data provisioning, application provisioning, Web server operations, electronic mail server operations, data traffic management, and any other type of server-based operations that enable data communication system 12 to retrieve, generate, and/or provide data with off-board systems, e.g., service center 20. For clarity of explanation, FIG. 1 shows gateway processor device 14 as a distinct element. However, "gateway" functionality may be implemented via software, hardware, and/or firmware within other one or more on-board modules, such as ECM 13, which communicates with off-board systems. Thus, gateway processor device 14 may, in certain embodiments, represent functionality or logic embedded within another element.

Transceiver device 15 includes one or more devices that transmit and receive information, such as information collected and stored by gateway processor device 14 from ECM 13 and GPS device 16. Transceiver device 15 may transmit the information to an off-board system, such as service center 20. Further, transceiver device 15 may receive information, such as requests for machine information from service center 20. Alternatively, transceiver device 15 may represent separate transmission and receiver devices, or other devices for providing a communication interface between machine 10 and service center 20.

GPS device 16 generates location data, e.g., GPS coordinates, for machine 10 based on data from a satellite, local tracking system, or any other position sensing system known in the art. The location data may be collected by gateway processor device 14 and may be transmitted to service center 20 via transceiver device 15.

FIG. 2 illustrates an exemplary communication system 60 including machine 10, service center 20 including a machine information database 22, a network 30 including, e.g., one or more additional wireless and/or wire-line communication networks (e.g., satellite networks, RF networks, fiber optic or coaxial cable based networks, twisted pair telephone line networks, or any other type of communication network), and other entities 40, e.g., owners (not shown), dealers 42, law enforcement 44, and vendors 46. According to certain embodiments, communication system 60 may perform one or more processes for identifying and/or locating machines 10 or machine components 11 implemented with a data communication system 12.

Figure 3:
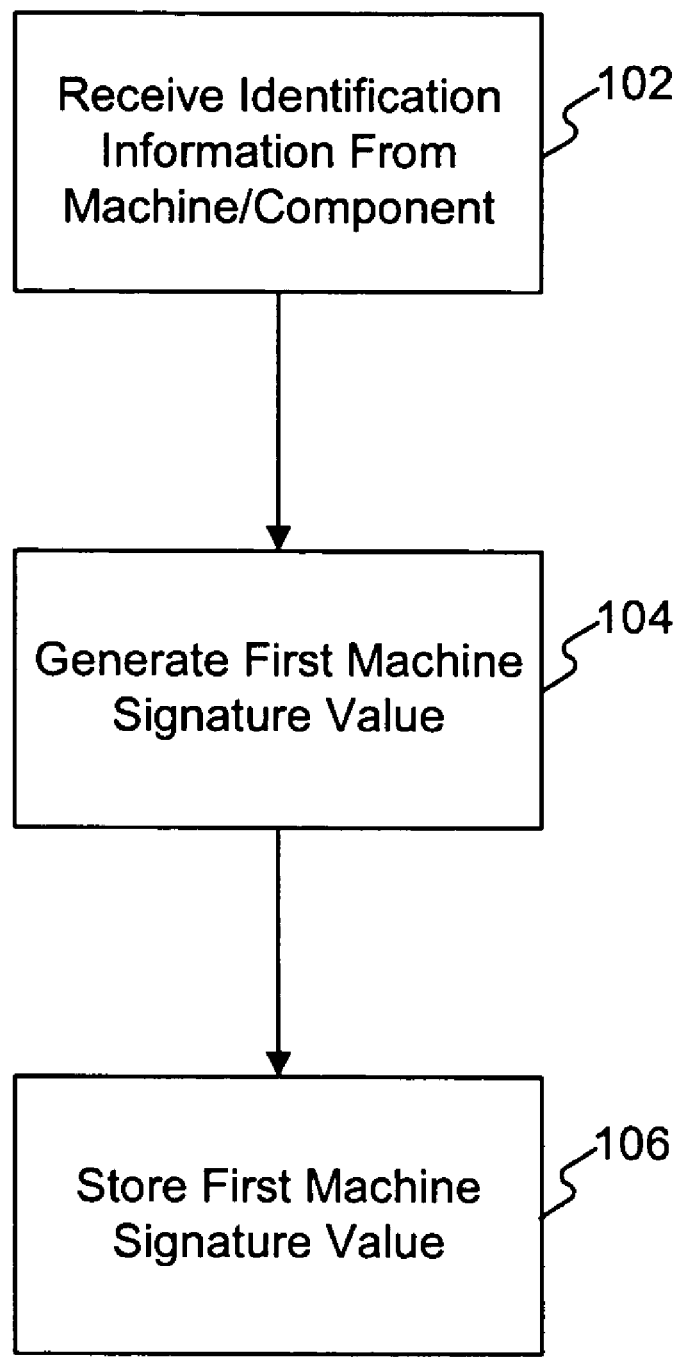
FIG. 3 is a flow chart illustrating an exemplary process for collecting, generating, and storing information consistent with certain disclosed embodiments.

FIG. 3 is a flow chart of an exemplary process for collecting, generating, and/or storing information related to machine 10 consistent with certain disclosed embodiments. In one embodiment, the process of FIG. 3 may be executed by service center 20 one or more times during the lifetime of machine 10 (e.g., following an assembly of machine 10, before machine 10 has been delivered to a work site, and/or after delivery of machine 10 to the work site). Steps 102-106 may also be executed once, after a predetermined event has occurred, or periodically at regular time intervals.

At some point, service center 20 receives machine data from data communication system 12 associated with machine 10 and/or machine component 11 (step 102). As described above, the machine data may include identification information assigned to machine 10 and/or component 11, machine data reflecting operational characteristics of machine 10 and/or machine component 11, etc. Service center 20 may also receive location data related to machine 10 and/or component 11, which is determined using GPS device 16, for machine 10 from data communication system 12.

Service center 20 uses the machine data received from machine 10 and/or component 11 to generate a first signature value associated with machine 10 and/or component 11 (step 104). The signature value may be generated using a predetermined algorithm stored in service center 20 and executed by a processor is preferably unique to machine 10 and/or component 11. For example, the algorithm may select one or more machine parameters, e.g., a machine identifier, a historical operational parameter, work site information or other scheduling parameter, and/or a fault code to generate the machine signature value. The algorithm may specify the specific parameters (e.g., a particular operational parameter at a certain time) to include in the signature value and the order of the specific parameters in the signature value. The signature value may include a series of values or a string of digits. The algorithm may be unique to a particular service center 20, machine 10 and/or component 11 based on its type, geographic location, function, network, vendor, dealer, owner, etc. Service center 20 stores the algorithms used for each machine 10 and/or component 11.

Once generated, service center 20 may store the first machine signature value in machine information database 22 (step 106). In addition, service center 20 may store the machine data used to uniquely identify machine 10 and/or component 11 (e.g., machine identifier and/or location data of machine 10 and/or component 11).

Aspects related to certain embodiments enable the machine signature value to be used to locate and verify the identity of a machine or machine component. In circumstances where a machine 10 and/or machine component 11 is reported to be in an abnormal condition, such as when it is missing (e.g., stolen, not returned at end of lease, moved from authorized locations, performing operations or tasks outside defined thresholds or time constraints, unscheduled operation, etc.), trigger events may be implemented to initiate processes for locating and/or verifying the identity of the inspected machines or components. Thus, machine 10 and/or machine component 11 may be determined to be missing based on an unscheduled trigger event, e.g., starting, changing operations, changing operators, moving, etc. For example, gateway processor device 14 may store scheduling data for machine 10 indicating when machine 10 is scheduled to operate and when it is scheduled not to operate. Gateway processor device 14 may also receive machine data (e.g., engine data from an engine ECM indicating when the engine has started, transmission data from a transmission ECM indicating when the transmission is operating, etc.). Gateway processor device 14 may compare the scheduling data to the machine data, e.g., in real time or periodically, to determine whether there is a conflict (i.e., machine 10 is operating when it is not scheduled). As a result, gateway processor device 14 may generate and send a reporting message to service center 20 via transceiver device 15 indicating that machine 10 is missing. The reporting message may include machine data, such as identification information used by service center 20 to identify machine 10 from other machines listed in machine information database 22. Alternatively, instead of missing machine 10 sending the reporting message directly to service center 20, an owner of missing machine 10 or another entity (e.g., dealers 42, law enforcement 44, and vendors 46) may generate and send the reporting message to service center 20 after determining that the machine is missing.

In another embodiment, service center 20 may store scheduling data for machine 10 and/or component 11. Further, service center 20 may receive messages periodically from machine 10 and/or component 11 that include location data for machine 10 and/or component 11. The messages received from machine 10 and/or component 11 may also include other identification information, such as the machine data used to identify machine 10 and/or component 11. Service center 20 may compare the location data to the stored scheduling data to determine whether there is a conflict. If so, service center 20 may identify an abnormal condition for machine 10 and/or component 11.

Figure 4:
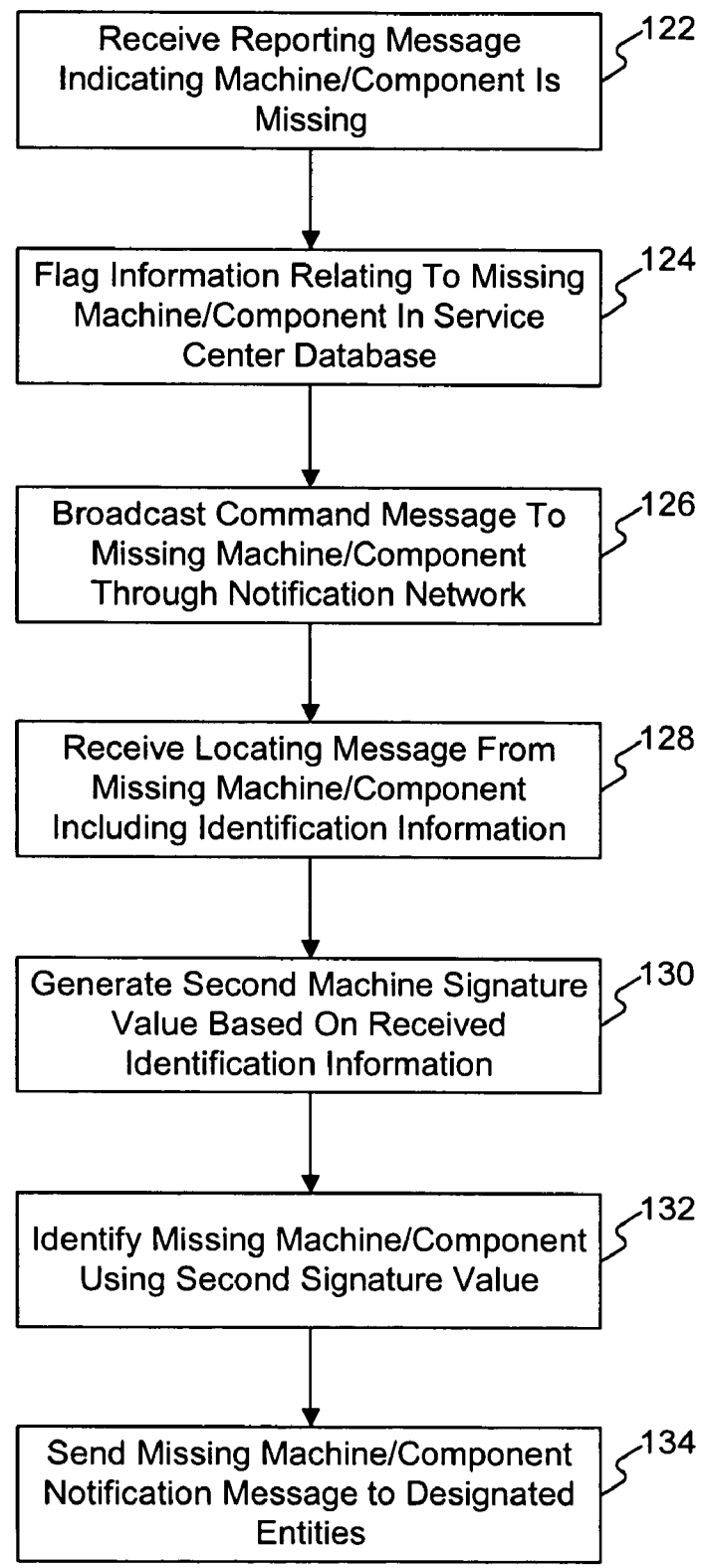
FIG. 4 is a flow chart illustrating an exemplary process for locating and identifying a missing machine consistent with certain disclosed embodiments.

FIG. 4 is a flow chart showing a locating process that may be executed by service center 20 to locate a missing machine 10 and/or component 11. Service center 20 receives the message reporting that machine 10 and/or component 11 is missing (step 122). Alternatively, service center 20 may determine that machine 10 and/or component 11 is missing based on other information (e.g., machine data). Service center 20 uses identification information included in the reporting message to identify data associated with machine 10 and/or component 11 in machine information database 22. Service center 20 may then flag the information in machine information database 22 associated with missing machine 10 and/or component 11 (step 124).

After flagging the information in machine information database 22, service center 20 may also send command messages through network 30 to command all missing machines 10 and/or components 11 that are flagged in machine information database 22 to reply with a locating message (step 126). In response to the command message from service center 20, missing machine 10 and/or component 11 may transmit the locating message to service center 20 via network 30 (step 128). The locating message may include location data associated with missing machine 10 and/or component 11 determined by GPS device 16 and machine data including identification information associated with missing machine 10 and/or component 11. Based on the identification information provided in the locating message, service center 20 may generate a second machine signature value associated with machine 10 (step 130). Service center 20 may generate the second signature value using the same algorithm used to generate the first signature value. By using the same algorithm to generate the first and second signature values, service center 20 may verify the identity of machine 10 and/or component 11 by comparing the generated second signature value to the set of first signature values stored in machine information database 22.

The specific parameters of the machine data transmitted to portable device 50 may be determined based on the algorithm used to generate the first signature value for machine 10 and/or component 11. In one embodiment, the specific parameters of identification information provided by missing machine 10 and/or component 11 in the locating message may be specified by service center 20 in the command message. For example, in the command message, service center 20 may request that missing machine 10 include in the locating message the specific parameters used to generate the first signature value, which are the same parameters used to generate the second signature value. In another embodiment, the specific parameters of identification information provided by missing machine 10 and/or component 11 in the locating message may be determined automatically by missing machine 10 and/or component 11. Machine 10 and/or component 11 stores information identifying the specific parameters used to generate the second signature value and may send the specified parameters to service center 20 when requested.

Once generated, service center 20 compares the second signature value to the set of first signature values associated with machines 10 and/or components 11 in machine information database 22. Because the same algorithm is used to determine the first and second machine signature values and the identification information used to generate the first and second machine signature values remains unchanged in missing machine 10 and/or component 11, the first and second signature values for machine 10 may be identical. In one embodiment, the signature values may be substantially identical. That is, values are substantially identical when they are equal to within a predetermined range, threshold, etc., of values, such as a percentage value (e.g., 1%), a decimal value, (e.g., within 0.0001, 0.001, 0.01, 0.1, etc.), or any other type of threshold or range. Thus, when the second signature value matches (or substantially matches) one of the set of first signature values listed in database 22, service center 20 may determine the identity of missing machine 10 (step 132). The comparison of the signature values may require an exact match or a substantial match. For example, to attain an exact match, service center 20 may determine the second signature value matches one of the first signature values when each digit in the value is identical to a corresponding digit of the first signature value (e.g., 00111 and 00111). On the other hand, to attain a substantial match, service center 20 may identify machine 10 and/or machine component 11 when a predetermined number of digits (or a predetermined percentage of digits, etc.) match (e.g., 00111 and 0011).

After determining the identity of missing machine 10, service center 20 may send a missing machine notification message to one or more designated entities, e.g., owners, dealers 42, law enforcement 44, and/or vendors 46 (step 134). The missing machine notification message identifies missing machine 10 and/or component 11 and may include, for example, machine identifier and/or location data, for identifying, locating, retrieving, and/or returning missing machine 10 and/or component 11 to its owner.

A portable device 50 (FIG. 2) may also be used to determine the identity of machine 10 and/or component 11. Portable device 50 may be a handheld device used by one or more entities 40, e.g., dealers 42, law enforcement 44, and/or vendors 46. Portable device 50 may be a handheld computer, implemented using, for example, PALM® or PocketPC® technology and wireless capabilities. Entity 40 may use portable device 50 to receive information using, for example, a sensor (e.g., an RFID reader or bar code reader) that gathers information from a communication port 18 on machine 10. The communication port 18 is connected to gateway processor device 14 to allow the information stored on gateway processor device 14 (or alternatively, ECM 13) to be transferred to portable device 50. Alternatively, a wireline link may be provided to removably attach portable device 50 to communication port 18, e.g., a Universal Serial Bus (USB) port, RS 232 port, or a port using another communication protocol in data communication system 12. Entity 40 may be able to access information received from gateway processor device 14 by executing software performed by portable device 50. Portable device 50 may also include a transceiver device 52 that allows portable device 50 to transmit information to and receive information from service center 20. Transceiver device 20 may transmit or receive information via wireless or wireline network to service center 20.

Figure 5:
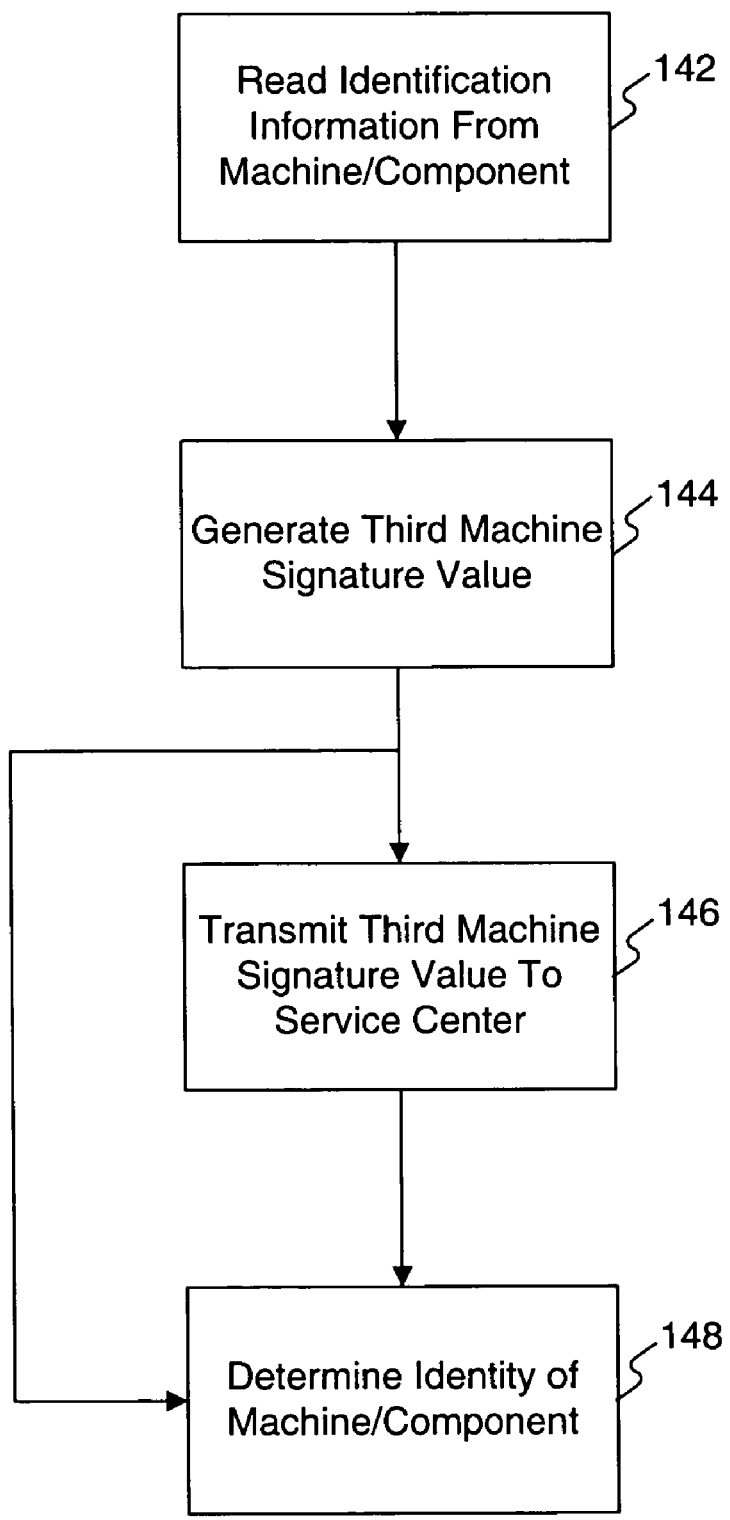
FIG. 5 is a flow chart illustrating an exemplary process for collecting, generating, and transmitting information using a portable device consistent with certain disclosed embodiments.

FIG. 5 is a flow chart showing a machine data collection process that may be executed by portable device 50 to collect, generate, and transmit information related to machine 10 and/or component 11. In one embodiment, portable device 50 may read machine data (e.g., identification information) from communication port 18 (step 142). A third machine signature value may be generated using the machine data transmitted to portable device 50 and the third machine signature value may be used to verify the identity of machine 10 and/or component 11 by comparing the third machine signature value to the set of first machine signature values stored in service center 20 and/or portable device 50.

The specific parameters of the machine data transmitted to portable device 50 may be determined based on the algorithm used to generate the first signature value for machine 10 and/or component 11. In one embodiment, portable device 50 may store one or more algorithms for generating machine signature values, such as the algorithms used to generate the first signature value for machine 10 and/or component 11. Portable device 50 may also be configured to receive one or more algorithms for storage from an off-board system, such as service center 20. Additionally, portable device 50 may receive algorithms from a removable storage device that is attached to portable device 50 by a user (e.g., entities 40). Once portable device 50 requests and receives selected machine data from gateway processor device 14, it may determine the algorithm to execute to generate the third machine signature value. In one embodiment, portable device 50 may receive information from service center 20 identifying which algorithm to execute based on the machine data collected by portable device 50. Alternatively, portable device 50 may execute a process that determines the algorithm to execute based on the collected machine data.

Portable device 50 may then generate the third machine signature value based on the machine data received from machine 10 and/or component 11 (step 144). The third machine signature value may be generated using the same algorithm used to generate the first machine signature value.

In one embodiment, portable device 50 transmits the third signature value to service center 20 (step 146). Service center 20 may compare the third signature value to a set of first signature values associated with one or more machines that is stored in machine information database 22 to determine the identity of machine 10 and/or component 11 (step 148). If the third signature value matches (or substantially matches) one of the set of first signature values stored in machine information database 22, service center 20 may generate data reflecting that the identity of machine 10 and/or component 11 is determined. After determining the identity of machine 10 and/or component 11, service center 20 may determine whether machine 10 and/or component 11 is flagged as a missing machine. If so, service center 20 may send a missing machine notification message to portable device 50. The missing machine notification message may include a machine identifier, location data, and any other information related to the machine (e.g., identity of the owner, contact information, etc.).

Alternatively, or additionally, portable device 50 may also execute a process that determines the identity of machine 10 and/or component 11 (step 148). To do so, portable device 50 may execute processes similar to those described above in connection with service center 20. For example, portable device 50 may compare the third signature value against a set of stored first signature values downloaded from service center 20. Portable device 50 may store data that is also stored in machine information database 22 and may receive periodic updates from service center 20. If the third signature value matches (or substantially matches) one of the first signature values, portable device 50 may generate data reflecting that the identity of machine 10 and/or component 11 has been determined. Portable device 50 may send this message to service center 20 for further processing. Thus, portable device 50 may be used to identify machine 10 without having to transmit the third signature value to service center 20.

Figure 6:
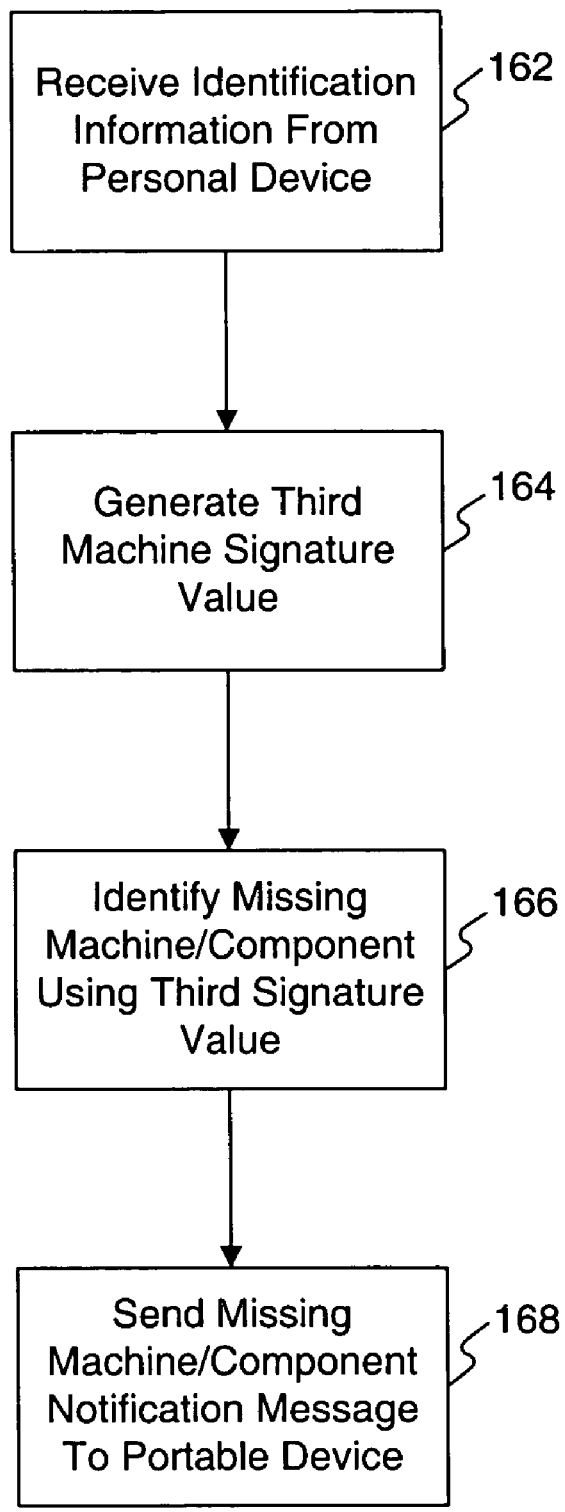
FIG. 6 is a flow chart illustrating an exemplary process for collecting and generating information using a portable device, and identifying a machine using a service center consistent with certain disclosed embodiments.

In another embodiment, service center 20 may generate the third signature value based on the machine data retrieved by portable device 50 and transmitted to service center 20. FIG. 6 is a flow chart showing an exemplary process executed by service center 20 for identifying machine 10 and/or component 11 based on machine data from portable device 50. In one aspect, portable device 50 may transmit the machine data received from machine 10 and/or component 11 to service center 20 (step 162). Based on the machine data, service center 20 may generate the third signature value in a manner similar to that described above in connection with portable device 50 (step 164).

Service center 20 may compare the third signature value to the set of first signature values stored in machine information database 22, as described above. If the third signature value matches one of the first signature values, service center 20 may generate data reflecting that the identity of machine 10 is determined (step 166). After determining the identity of machine 10 and/or component 11, if it is determined that machine 10 and/or component 11 is flagged as a missing machine, service center 20 may send a missing machine notification message to portable device 50 (step 168). Service center 20 may also send a missing machine notification message to other designated entities 40, e.g., dealers 42, law enforcement 44, and/or vendors 46.

INDUSTRIAL APPLICABILITY

The disclosed method and system provides machine signatures that allow machines and/or machine components to be accurately identified. Several advantages over the prior art may be associated with the disclosed embodiments, such as providing an electronic authentication system to assist entities in accurately locating missing machines or components.

For example, machines 10 and/or components 11 may be identified without personnel having to rely on embedded identification numbers that are accessible by unauthorized persons who may tamper or modify the numbers. Instead, a unique signature may be generated for each machine 10 and/or component 11 based on that machine's unique operational characteristics, e.g., historical run-time data, faults, etc. Moreover, the unique signature may dynamically change based on the type of machine data used to form the machine signature.

For example, machine dealers in a dealer network who perform service on machines, sell, and/or lease machines may be apprised of missing machines/components from service center 20. Accordingly, when a dealer performs service on a machine/component, or performs some transaction related to a machine or component (e.g., sell, lease, etc.), it may initiate processes to generate and check machine signatures for the given machine or component. For instance, a dealer, manager, etc., may maintain a database of first machine signatures for a fleet of machines. Service center 20 or the dealer/manager may broadcast commands to all machines/components within a geographical range (e.g., dealer yard, work site, etc.) to send generated machine signatures (if calculated on-board) or machine data. The dealer may perform processes to calculate the second signature value for each reporting machine/component to compare to the maintained set of first signature values. Thus, the dealer may identify each machine within its designated area(s).

In accordance with certain disclosed embodiments, machines 10 and/or components 11 may automatically send messages to service center 20 reporting that they have been stolen, moved, operated outside valid or authorized ranges, etc., and in response, service center 20 may automatically send missing machine notification messages to designated entities, e.g., local law enforcement, vendors, and dealers. Thus, these entities may be kept apprised of machine/component abnormal conditions, such as thefts. Thus, the time to recover stolen machines and/or components is reduced, and the likelihood that machine 10 and/or component 11 may be recovered is increased.

Portable devices 50 may be provided to inspection agents, e.g., law enforcement, customs agents, dealers, etc., so that they may inspect a machine/component, such as at a stop and check on the highway, at a border, in a dealer lot, etc. The inspection agents may be notified once machine 10 and/or component 11 makes the determination that it has been stolen and/or when some entity notifies service center 20 that it has been stolen or is missing. Furthermore, inspection agents may properly identify a machine that is being inspected and may be notified if the machine has been reported missing. If the machine identification information inscribed on the machine is not readable and data communication system 12 on machine 10 is unable to transmit identification information, e.g., transceiver device 15 is removed or damaged, the inspection agent may still use portable device 50 to read the identification information from the data communication system 12.

It will be apparent to those skilled in the art that various modifications and variations can be made to the method and system for providing signatures for machines. Other embodiments will be apparent to those skilled in the art from consideration of the specification and practice of the disclosed method and system for providing signatures for machines. It is intended that the specification and examples be considered as exemplary only, with a true scope being indicated by the following claims and their equivalents.

What is claimed is:

1. A method for identifying at least one of a machine and a machine component, comprising:

storing an algorithm for generating a machine signature value associated with the at least one of the machine and the machine component;

receiving a first set of machine data from the at least one of the machine and the machine component, the machine data reflecting at least one operational characteristic of the at least one of the machine and the machine component;

generating, using the algorithm, a first machine signature value based on the first set of machine data;

storing the first machine signature value;

accessing the stored first machine signature value to verify the identity of the at least one of the machine and the machine component;

receiving a second set of machine data from the at least one of the machine and the machine component;

generating, using the algorithm, a second machine signature value based on the second set of machine data;

comparing the first machine signature value to the second machine signature value; and identifying the at least one of the machine and the machine component based on the comparison of the first and second machine signature values.

2. The method of claim 1, further including sending a message identifying the at least one of the machine and the machine component to an off-board system.

3. The method of claim 1, further including:
reading a third set of machine data from the at least one of the machine and the machine component using a portable device that connects to the machine;
using the algorithm to generate a third machine signature value based on the third set of machine data;
comparing the first machine signature value to the third machine signature value; and
identifying the at least one of the machine and the machine component based on the comparison of the first and third machine signature values.

4. The method of claim 3, wherein the portable device generates the third machine signature value and compares the first and third machine signature values.

5. The method of claim 1, further including:
receiving a reporting message from the at least one of the machine and the machine component, when the at least one of the machine and the machine component is in an abnormal condition; and
sending, based on the reporting message, a command message to the at least one of the machine and the machine component to command the at least one of the machine and the machine component to respond with a locating message, the locating message including location data relating to a geographical location of the at least one of the machine and the machine component.

6. The method of claim 5, wherein the abnormal condition includes at least one of an unscheduled staff and an unscheduled change in location of the at least one of the machine and the machine component.

7. The method of claim 5, wherein the locating message includes a second set of machine data, and the method further includes:
using the algorithm to generate a second machine signature value based on the second set of machine data;
comparing the first machine signature value to the second machine signature value; and
identifying the at least one of the machine and the machine component based on the comparison of the first and second machine signature values.

8. The method of claim 5, further including:
in response to the reporting message, analyzing a set of stored machine signature values, the set of stored machine signature values including the first machine signature value; and
flagging, based on the analysis, the first signature value to indicate that the at least one of the machine and the machine component is in the abnormal condition.

9. The method of claim 1, wherein the first set of machine data includes at least one of an identifier for the at least one of the machine and the machine component, historical operational information relating to the at least one of the machine and the machine component, scheduling information relating to an operation of the at least one of the machine and the machine component, and a fault code relating to the at least one of the machine and the machine component.

10. A method for identifying at least one of a machine and a machine component, comprising:
generating a first machine signature value associated with an operational characteristic of the at least one of the machine and the machine component at a first location;
associating the first machine signature value with identification information for the at least one of the machine and the machine component;
generating a second machine signature value associated with an operational characteristic of the at least one of the machine and the machine component at a second location;
comparing the first machine signature value to the second machine signature value; and
identifying the at least one of the machine and the machine component based on the comparison of the first and second machine signature values.

11. The method of claim 10, wherein the first and second machine signature values include at least one of an identifier for the at least one of the machine and the machine component, historical operational information relating to the at least one of the machine and the machine component, scheduling information relating to an operation of the at least one of the machine and the machine component, and a fault code relating to the at least one of the machine and the machine component.

12. The method of claim 10, further including sending a message identifying the at least one of the machine and the machine component to at least one of an owner of the at least one of the machine and the machine component, a vendor of a type of the at least one of the machine and the machine component, a dealer of the type of the at least one of the machine and the machine component, and a law enforcement agent.

13. The method of claim 10, further including generating the second machine signature value when the at least one of the machine and the machine component is in an abnormal condition.

14. The method of claim 10, further including generating the second machine signature value after a reader device reads identification information from the at least one of the machine and the machine component at the second location.

15. A system for identifying at least one of a machine and a machine component, comprising:
a service center configured to:
store an algorithm for generating a machine signature value associated with the at least one of the machine and the machine component;
receive a first set of machine data from the at least one of the machine and the machine component, the machine data reflecting at least one operational characteristic of the at least one of the machine and the machine component;
generate a first machine signature value based on the algorithm and the first set of machine data;
store the first machine signature value; and
access the stored first machine signature value to verify the identity of the at least one of the machine and the machine component.

16. The system of claim 15, further including a reader device configured to:
receive a second set of machine data from the at least one of the machine and the machine component;
generate a second machine signature value based on the algorithm and the second set of machine data;
compare the first machine signature value to the second machine signature value; and
identify the at least one of the machine and the machine component based on the comparison of the first and second machine signature values.

17. The system of claim 15, further including a reader device configured to:
receive a second set of machine data from the at least one of the machine and the machine component; and
send the second set of machine data to the service center;

wherein the service center is further configured to:
  generate a second machine signature value based on the algorithm and the second set of machine data;
  compare the first machine signature value to the second machine signature value; and
  identify the at least one of the machine and the machine component based on the comparison of the first and second machine signature values.

18. The system of claim 15, wherein the at least one of the machine and the machine component is configured to send a second set of machine data to the service center; and wherein the service center is further configured to:
  generate a second machine signature value based on the algorithm and the second set of machine data; and
  compare the first machine signature value to the second machine signature value; and
  identify the at least one of the machine and the machine component based on the comparison of the first and second machine signature values.

* * * * *